April 20, 1937.  P. J. COUTURE  2,077,743
PROCESS OF WRAPPING LOAVES OF BREAD

Filed July 5, 1935

Philippe J. Couture, Inventor

By Harris K. Frascon, Attorney

Patented Apr. 20, 1937

2,077,743

UNITED STATES PATENT OFFICE 2,077,743

PROCESS OF WRAPPING LOAVES OF BREAD

Philippe J. Couture, Lewiston, Maine

Application July 5, 1935, Serial No. 29,877

2 Claims. (Cl. 99—172)

This invention relates to a process of wrapping loaves of bread and an object of the invention is to so wrap a loaf of bread as to permit the slices to be visualized through a window at the bottom of the loaf. A further object of the invention is to protect the bread from deterioration for an appreciably longer period of time than is usual, by enclosing it in an air-tight wrapper. A further object is the provision of a simple, effective and relatively inexpensive wrapper that may be easily and quickly applied. With these objects in view, the invention is illustrated by the accompanying drawing, described in the following application, and its salient features are set forth in the appended claims.

Figure 1:
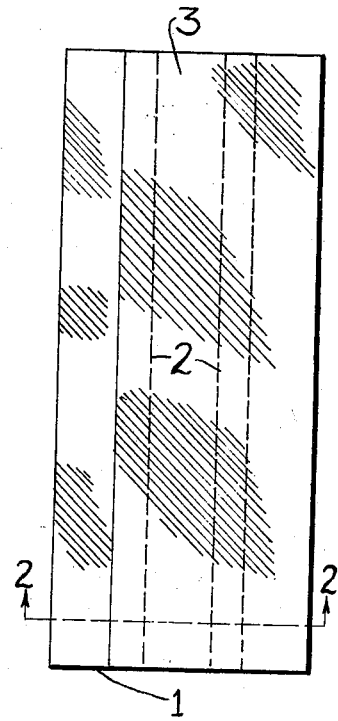
Fig. 1 is a bottom view of a wrapped loaf of bread, showing the window in the wrapper.

By referring to Fig. 1, it will be noted that the wrapper comprises a sanitary sheet of paper 2, waxed on both sides, which is adapted to be wrapped around the girth of the loaf and to cover the top, sides and ends. The edges of the sheet, as indicated, are so folded on the bottom of the loaf that a gap 3 of approximately 1½" or more, is left between the edges. This sanitary sheet constitutes the inner wrapper for the loaf of bread and displays the usual descriptive and advertising matter, and trade-mark.

Figure 2:
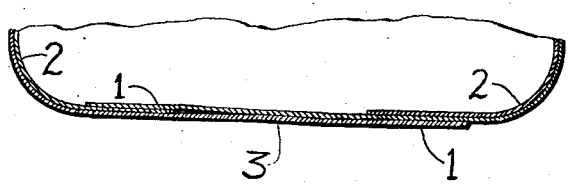
Fig. 2 is a fragmentary vertical section along the line 2—2 of Fig. 1.
Figure 3:
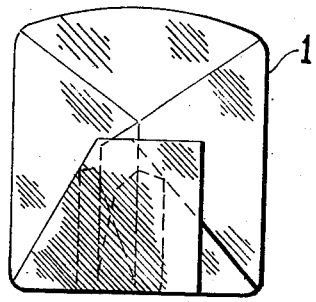
Fig. 3 is an end view of the wrapped loaf.

An outer wrapper 1, Figs. 1, 2 and 3, of cellulose, or other transparent material, is next wrapped around the girth of the loaf and overlaps the spaced edges of the inner wrapper at the bottom of the loaf, one edge of the outer wrapper passing to one side of the gap 3 and the other edge of the wrapper passing to the opposite side of the gap for an appreciable distance. The outer wrapper is adhesively connected with the inner wrapper at each side of the gap and the free end of the outer wrapper is then adhesively fixed to the adjacent portion of itself which it overlies. The wrappers are longer than the loaf of bread and the two wrappers are interfolded to cover the ends of the loaf and then sealed by an adhesive, or other suitable means. It is obvious that a window of double thickness is thus provided and a positive sealing of the loaf of bread is accomplished.

It is evident from the foregoing description of the invention, considered in connection with the drawing, that a sanitary, hermetically-sealed and perfectly visualized loaf of bread is assured by the application of this invention.

What I claim is:

1. A package consisting of a loaf of bread and a wrapper comprising an inner layer of material, of less width than the girth of the loaf, that is so wrapped around the loaf as to leave a gap at the bottom, an outer layer of transparent material which overlies said inner layer of material and is double-lapped on the bottom.

2. A package consisting of a loaf of bread and a wrapper, said wrapper comprising a printed sulphite waxed sheet drawn partly around the girth of the loaf, leaving a gap at the bottom, and a double wrapping of cellulose transparent paper double-lapped on the bottom covering said inner waxed sheet and gap.

PHILIPPE J. COUTURE.